United States Patent
Lindgren

(10) Patent No.: US 10,918,199 B2
(45) Date of Patent: Feb. 16, 2021

(54) SUBMERGED NET CLEANER

(71) Applicant: Peter B. Lindgren, Pompano Beach, FL (US)

(72) Inventor: Peter B. Lindgren, Pompano Beach, FL (US)

( * ) Notice: Subject to any disclaimer, the term of this patent is extended or adjusted under 35 U.S.C. 154(b) by 228 days.

(21) Appl. No.: 15/760,493

(22) PCT Filed: May 12, 2016

(86) PCT No.: PCT/US2016/031988
§ 371 (c)(1),
(2) Date: Mar. 15, 2018

(87) PCT Pub. No.: WO2016/183274
PCT Pub. Date: Nov. 17, 2016

(65) Prior Publication Data
US 2018/0242726 A1   Aug. 30, 2018

Related U.S. Application Data

(60) Provisional application No. 62/160,319, filed on May 12, 2015.

(51) Int. Cl.
| | | |
|---|---|---|
| A46B 13/00 | (2006.01) |
| A01K 61/60 | (2017.01) |
| A01K 63/10 | (2017.01) |
| A46B 7/04 | (2006.01) |
| A46D 1/00 | (2006.01) |
| B08B 1/04 | (2006.01) |
| B63G 8/00 | (2006.01) |
| B63G 8/08 | (2006.01) |
| B63B 59/08 | (2006.01) |

(52) U.S. Cl.
CPC ............ *A46B 13/001* (2013.01); *A01K 61/60* (2017.01); *A01K 63/10* (2017.01); *A46B 7/04* (2013.01); *A46D 1/0253* (2013.01); *B08B 1/04* (2013.01); *B63G 8/001* (2013.01); *B63G 8/08* (2013.01); *B63B 59/08* (2013.01); *B63G 2008/007* (2013.01); *Y02A 40/81* (2018.01)

(58) Field of Classification Search
CPC ....... A46B 13/001; A46B 13/008; A46B 7/04; A47L 11/4011; A47L 2201/06; A01K 61/60; A01K 63/10; A46D 1/0253; B08B 1/04; B63G 8/001; B63G 8/08; B63G 2008/007; Y02A 40/826; B63B 59/08
USPC .................. 15/1.7, 40, 52; 119/232, 264
See application file for complete search history.

(56) References Cited

U.S. PATENT DOCUMENTS

| | | | |
|---|---|---|---|
| 3,628,489 A * | 12/1971 | Michaelsen ............ | B63B 59/08 114/222 |
| 4,084,535 A | 4/1978 | Rees | |
| 4,252,081 A | 2/1981 | Smith | |
| 4,493,125 A | 1/1985 | Collis | |
| 4,838,193 A | 6/1989 | van der Tak | |
| 4,970,747 A | 11/1990 | Pastore | |

(Continued)

*Primary Examiner* — Monica S Carter
*Assistant Examiner* — Alberto Saenz
(74) *Attorney, Agent, or Firm* — McHale & Slavin, P.A.

(57) ABSTRACT

An apparatus for cleaning nets underwater comprising a cleaning head formed from at least one propeller having a perimeter rim available for receipt of knuckles. The cleaning head is positioned against the surface of an underwater net wherein the cleaning features are constructed and arranged to remove growth from the nets.

6 Claims, 8 Drawing Sheets

(56) References Cited

U.S. PATENT DOCUMENTS

| | | | |
|---|---|---|---|
| 6,070,547 A | 6/2000 | Achord | |
| 6,886,486 B2 | 5/2005 | Van Rompay | |
| 8,635,730 B2 | 1/2014 | Heard | |
| 8,881,683 B2 * | 11/2014 | Lindgren | A01K 75/00 |
| | | | 119/232 |
| 9,487,281 B2 * | 11/2016 | Wolfenbarger | B63G 8/001 |
| 2008/0095578 A1 * | 4/2008 | Farber | B60P 3/10 |
| | | | 405/3 |
| 2009/0173677 A1 | 7/2009 | Seura | |
| 2012/0260443 A1 * | 10/2012 | Lindgren | A01K 63/10 |
| | | | 15/77 |
| 2013/0263770 A1 * | 10/2013 | Andersen | B63B 59/08 |
| | | | 114/330 |
| 2013/0327534 A1 * | 12/2013 | Christie | E21B 33/076 |
| | | | 166/345 |

\* cited by examiner

SUBMERGED NET CLEANER

CROSS REFERENCE TO RELATED APPLICATIONS

This is a national stage filing in accordance with 35 U.S.C. § 371 of PCT/US2016/031988, filed May 12, 2016, which claims the benefit of the priority of U.S. Provisional Patent Application No. 62/160,319, filed May 12, 2015, the contents of each are incorporated herein by reference.

FIELD OF THE INVENTION

This invention is related to the field of open ocean aquaculture and, in particular, to a submerged net cleaner.

BACKGROUND OF THE INVENTION

Fish farming, often called aquaculture in offshore ocean environments, is responsible for a large part of fish supply for human consumption. Feed is the largest cost of fish farming. Cleaning marine fouling from or replacing nets to maintain good water flow and healthy conditions is often the second largest cost. During winter months cleaning may be required only every 2 months. During summer months cleaning may be needed every 10 to 15 days and growth can easily get out of control risking proper water flow, reduced dissolved oxygen, slower growth and increased moralities.

The Applicant developed a technique for aquaculture net cleaning using elastomeric cleaning fingers with a "hook" shape, which issued as U.S. Pat. No. 8,881,683. The hook shapes are mounted to the rim of a rotating propeller wheel and advanced against the net. The elastomeric hooks enter into the holes of the net, contact and pull on the net from the back side, removing fouling from the back side and then wiping the front side. The hooks on an opposite rim of the propeller wheel cleans similarly with the fingers moving in the opposite direction to provide cleaning from both directions. The propeller forces the cleaning head forward onto the net with sufficient force to keep the cleaning hook features properly engaged with the net.

The dominate current technology used to clean aquaculture cages uses high velocity water jets powered at 2000-5000 PSI. This is partially effective but inefficient because the high velocity jet dissipates very quickly underwater. An example is a high speed bullet will travel only a few feet in water due to the huge energy dissipation of the water. Also the net moves easily away from the water jet increasing distance and reducing cleaning efficiency. The water pressure and volume must be extremely high for this to work because of high energy dissipation of water and inherent hydraulic inefficiencies. The cost of fuel and maintenance are high especially with common pressures of 5000 PSI salt water. Also a significant part of the high pressure water is supplied to a thrust nozzle necessary to push the cleaner toward the net. Infrastructure of large boats, high fuel consumption, maintenance and labor are the reasons for the very high cost.

Recently many new devices to automate cage net cleaning with robotic systems have been developed. High pressure water jets are still used to clean the net. Some also use suction hoses to remove the debris. Novelty of cage cleaning robots includes how to move and control a cleaning head position the with known cleaning methods.

Typically only the sides of the cages are cleaned because they are more important for water flow and are easier to clean than the bottom of the cage. However the bottom of the cage can become heavy enough to cause floatation problems and the biofouling is undesirable.

The bottom of the cage can be cleaned by towing the high pressure water jet systems across the cage with a rope which is labor intensive. Also there are robotic cleaners that are very expensive that can clean the bottom of the cage. They have not seen widespread use due to the cost. Video surveillance is a feature often added to the robot units. Additional problems in aquaculture net cleaning is mobility of the power source. High pressure water cleaners are available up to 500 HP and 200 HP is not unusual. Large boats are required to handle the engine, water pump, water filter systems and high pressure water hoses making cost high. Also to provide a high pressure water cleaning or vacuum cleaning system requires handling huge volumes of hoses. To provide video, lighting and controls adds substantially to the deployment and hauling problem including wire cables in addition to the water and vacuum hoses.

The largest type of cages used are built circular, with large polyethylene pipe for surface floatation. Currently large boats, crews and high pressure cleaners operate around these cages in a cleaning process at a very high cost. The second type of fish cages used offshore are built with square galvanized steel deck and frame with large rotomolded floats underneath for flotation. The steel cages are of sufficient width and floatation capable to support forklifts with 1 ton bags of feed. The MIC net cleaner is one example of a robotic net cleaner. MPI and AKVA group is one example of a supplier of high pressure water net cleaner. AKVA Group also sells round polyethylene cages and square steel aquaculture cages.

DESCRIPTION OF RELATED ART

Randol U.S. Pat. No. 3,628,489 discloses a scouring apparatus with a flexible sheet that can conform a surface with tools that can conform and scour/clean. There is no teaching of articulation that could pretrude the porous wall of a net as the current invention.

Rees U.S. Pat. No. 4,084,535 discloses inclination of brush heads by a diver to control the cleaning. This has been tested in the current Lindgren invention and it works well. There is no improvement of the brush itself as thought in the current invention.

Smith U.S. Pat. No. 4,252,081 discloses a rotating cage partially surfaced to clean.

Collis U.S. Pat. No. 4,493,125 discloses a tooth brush for brushing the puccal and lingual sufaces of the teeth. The brushes have curved surfaces to improve the bristles contact with the surface to be cleaned. The curved bristles are not designed to protrude into the holes of a net and also are to be of ordinary brush fibers. There is no mention of elastomers durometer materials or steel.

Vand de Tak U.S. Pat. No. 4,838,193 discloses a controlled rotating brush with suction to force the brush onto a surface.

Pastore U.S. Pat. No. 4,970,747 discloses a cylindrical rotating brush with sealed motor.

Achord U.S. Pat. No. 6,070,547 discloses a cleaning device with flow paths to exit debris from the device and an impeller to hold the device to the hull of a ship.

Van Rampay U.S. Pat. No. 6,886,486 B2 discloses a device that cleans a ships hull.

Watanuke S56-62188 discloses inward facing scraping claws arranged around the edge mouth of a hopper shaped suction intake hose. The claws do not rotate.

Miki J P, 08-228614 discloses cleaning a plated film of a IKESU metal wire gauze. The Mike brush strands are polypropylene or similar, not to impair the plated film. The blades (propeller) are attached to the outer peripheral part generating thrust. The brush is implanted in the rotating disc. There is no mention of articulated cleaning elements or use of propeller blades that form peripheral to the hub and the cleaning elements at the peripheral. A cleaning device of counterrotating brushes is also described in U.S. Pat. No. 4,084,535.

Takeuchi JP 409009818A discloses a magnetically attracting caster roller and corresponding roller on opposite side of the net and cleaning with rotary brushes protruding from the center of the belly part.

JP409044238A discloses automatic travel control for underwater cleaning device. Includes azimuth attitude, depth, driving motors, controller and computer with water jet cleaning.

Tominga JP410035587A discloses high pressure water to clean net using a high pressure water jet for Remote Operated Vehicle control so not to get garbage caught in propeller. Tominga discloses a skid with a thruster motor to maintain net proximity.

Heard U.S. Pat. No. 8,635,730 discloses a skid, buoyancy device, a driving device adapted to cooperate with said net and maneuver of the net cleaner about the surface of the net. A propulsion device is used to propel the net cleaner onto and contact the net, and the cleaning device is adapted to clean the net. Heard states the buoyancy tanks are used to alleviate most of the strain and stress put on the net as the cleaner climbs the side wall of a submerged net.

SUMMARY OF THE INVENTION

Disclosed is an apparatus for cleaning nets underwater comprising a cleaning head formed from at least one propeller rotated by an electric or hydraulic propeller. A perimeter rim is coupled to the rotating propeller having cleaning features mounted to the perimeter rim. Key to maximized cleaning of the net is the cleaning features comprising the fingers/knuckles/torsions feature elements. The rotation of the propeller provides thrust for positioning the cleaning head against a net, positioned wherein the cleaning features are constructed an arranged to remove fouling from the net by agitating the net.

An objective of the invention is to provide improved efficiency in the cleaning of a net.

Another objective of the invention is to provide a system that requires only 10-20% of the power of existing cleaners due to the inefficiency of high pressure water systems and the high efficiency of the new cleaning method. The opportunity to redesign the power supply system is significant to reducing the cost.

Still another objective of the invention is to provide a cleaning head that allows for the development of smaller lighter systems with improved cleaning from smaller boats or mobile dock operated equipment.

Yet still another objective of the invention is to provide a net cleaning device that includes options to maximize performance based on net mesh size and the type of fouling.

Another objective of the invention is to provide a total system approach to improve net cleaning and reduced farm cost.

Yet still another objective of the invention is to provide a cleaning head that allows for better cleaning method and system efficiency and no longer requires large boats and big engines and associated cost.

Still another objective of the invention is to improve upon the Applicant's prior invention which has demonstrated an ability to lower the cost of cleaning fish cage nets by more than half, reducing weight, horsepower, improved portability, and maintenance wherein improvement includes improving the elastomeric finger life, the ability to clean the bottom of the cage and remove more difficult fouling like barnacles, mussels and kelp. Also are improved designs for deployment and hauling the cleaning head. A special ambical cable has been designed with a unique storage spool. Integrated controls can automatically cycle deployment and hauling of the cleaning head and forward progress of a unique power supply tractor.

Other objectives and further advantages and benefits associated with this invention will be apparent to those skilled in the art from the description, examples and claims which follow.

DETAILED DESCRIPTION OF THE PREFERRED EMBODIMENT

Figure 1:
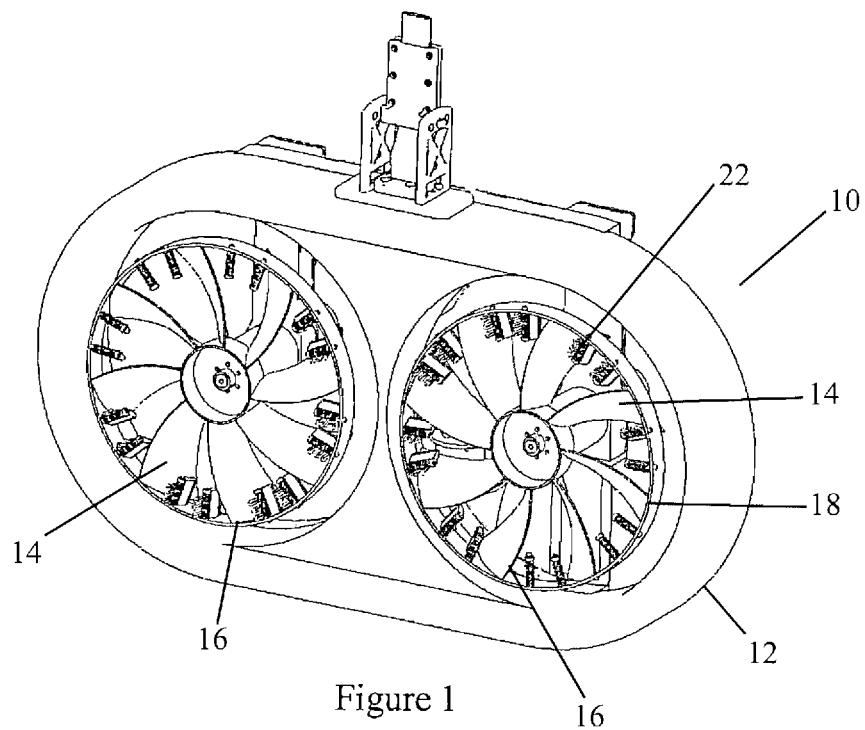
FIG. 1 is a front perspective view of the frame and cleaning head.

A detailed embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring now to the Figures in general, set forth is a cleaning head 10 having a frame 12 for mounting of a first hub 11 with a plurality of propeller blades 14 positioned around the hub. A perimeter rim 16 is formed along an outer edge of the propeller blades 14. A second hub 11' is mounted adjacent to the first hub 11 forming a mirror image of the first hub 11. The second hub 11' also includes a plurality of propeller blades 14' positioned around the hub. In addition, a second perimeter rim 16' is formed along an outer edge of the propeller blades 14'. For ease of explanation, only a single propeller 18, including a hub 11, plurality of propeller blades 14, and perimeter rim 16, will be discussed with the understanding that a second propeller, or multiple propellers can be added to the system.

The perimeter rim 16 is used for mounting various cleaning features. The cleaning features disclosed in this application include a torsion spring assembly 22, knuckles 52, fingers 60, or combinations thereof. The hub 11 is mounted on a shaft and driven by either an electric motor 24 or a hydraulic motor.

The blades 14 are constructed and arranged to provide forward thrust to engage the cleaning features against an underwater net when the motor is operational. Electric motors 24 are preferred as they can employ a custom cable that can support video, thrusters, lighting and other accessories. The system requires 5 HP if electric and 7 HP if hydraulic driven per meter of cleaning width.

A benefit of an electric driven system is the use of a flat cable which allows efficient winding on a single vertical wrap spool. For instance, with motor drive boards included in the cleaner head, only two DC main power wires are necessary leaving plenty of space for video cables, pneumatic tubes and control wires adjacent to the main power wires. The custom cable for a 1 meter cleaning system has been produced measuring 1.5 inches wide×0.375 inches width including: 2 #6 gauge copper wires' 2—Video cables; 2—Pneumatic tubes; 9—Control wires.

Figure 7:
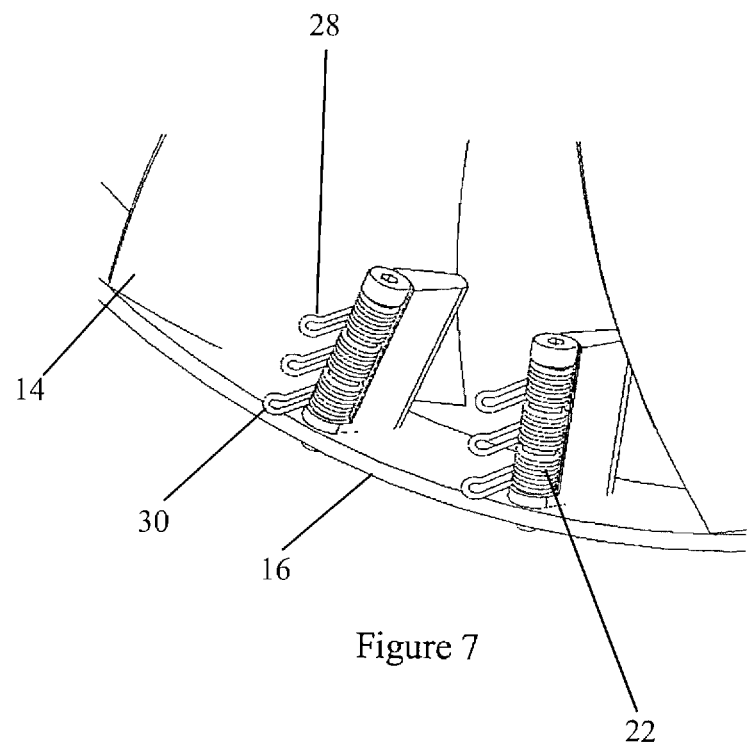
FIG. 7 illustrates a torsion spring assembly with a portion of the propeller wheel.
Figure 8:
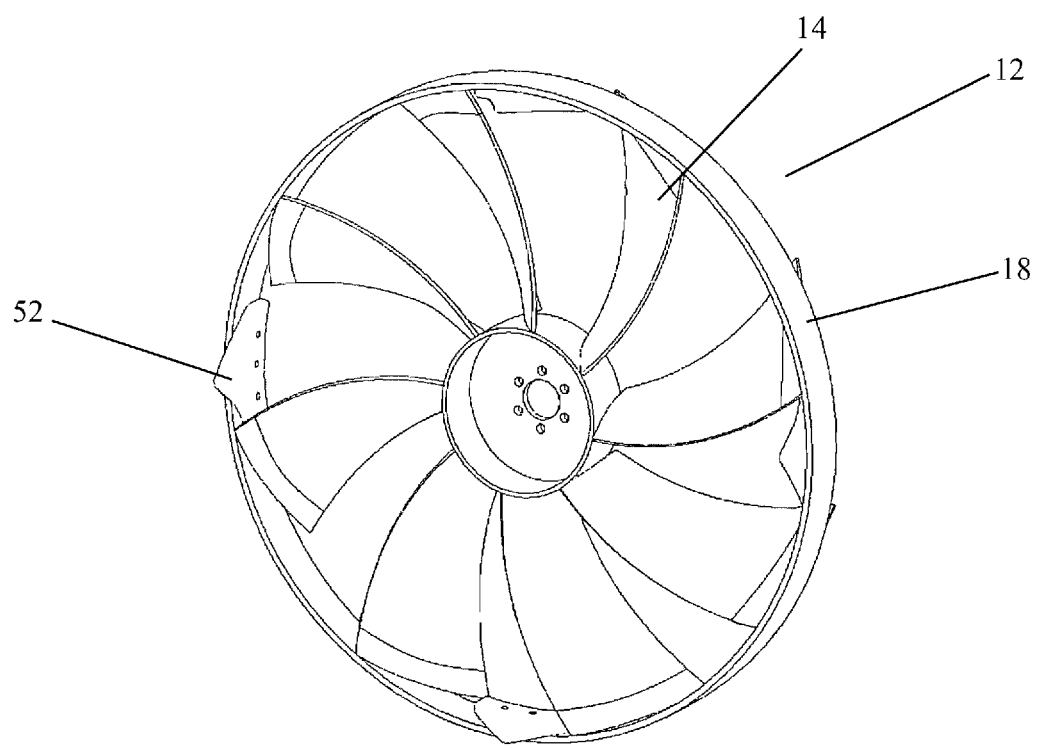
FIG. 8 illustrates a propeller with knuckles.
Figure 9:
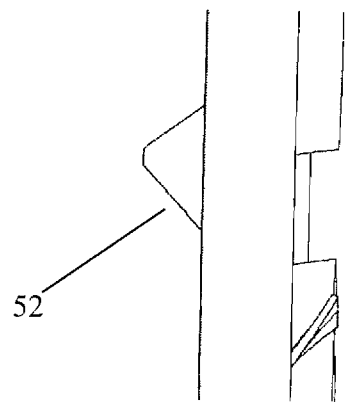
FIG. 9 illustrates a side view of a knuckle.

In the preferred embodiment, electric power wires are 24 VDC and pneumatic tubes can be used for pressure compensation of electronic housing and steering. The control wires support on/off and speed control of all motors. In addition, a support tractor is employed which includes features such as an: elevated boom to lift the head over the safety rail of the dock; Power Unit; Control and display console; Seat; Powered wheels; 2 or 4 wheel steering; Electric and pneumatic rotary unions, or hydraulic; Compressed air source; Compact wheel base; and a programmable controller (PLC) dock station for the cleaning head when not in use. For ease of explanation, a single propeller b Referring to FIGS. 1 & 3-7, illustrated is the continuous perimeter rim 16 formed at the end of the propeller blades 14. The perimeter rim 16 is used for mounting a plurality of corrosion resistant torsion spring assembly elements 22. Each element is based upon a wire diameter D between 0.020 inches and 0.070 inches. The torsion spring assembly feature 22 has a biased torsion spring between 1 and 12 torsion rotations. Each propeller blade 14 may have a single torsion spring assembly 22 feature or multiple torsion spring assembly features as depicted in FIG. 7. Each torsion spring assembly 22 includes an extended length 26 with a 180 degree bend, forming a smooth contoured extended end 30, so as to avoid damaging the fibers of the net material. The extended end 30 has a bend 28 of approximately 30 degrees leading to a rounded tip that can be modified to improve cleaning by bending the tip forward 45-90 degrees to improve contact with the rearward part of the net. The torsion spring can be designed with a shorter pivot radius eliminating memory set and fatigue problems common to elastomer fingers. This is particularly important for smaller mesh nets that cannot be cleaned as well with elastomeric fingers.

The propeller 18 operates to push the cleaning head 10 against a submerged net allowing the torsion springs to engage the net, causing rapid impacts. Key to the stainless steel fingers is a torsion spring with articulated end to contact the net including bending the extended cleaning wire 180 degrees forming a smooth tip created by the bend that cannot damage the net fibers. Wires can be used with 1 to 12 torsion revolutions.

Figure 2:
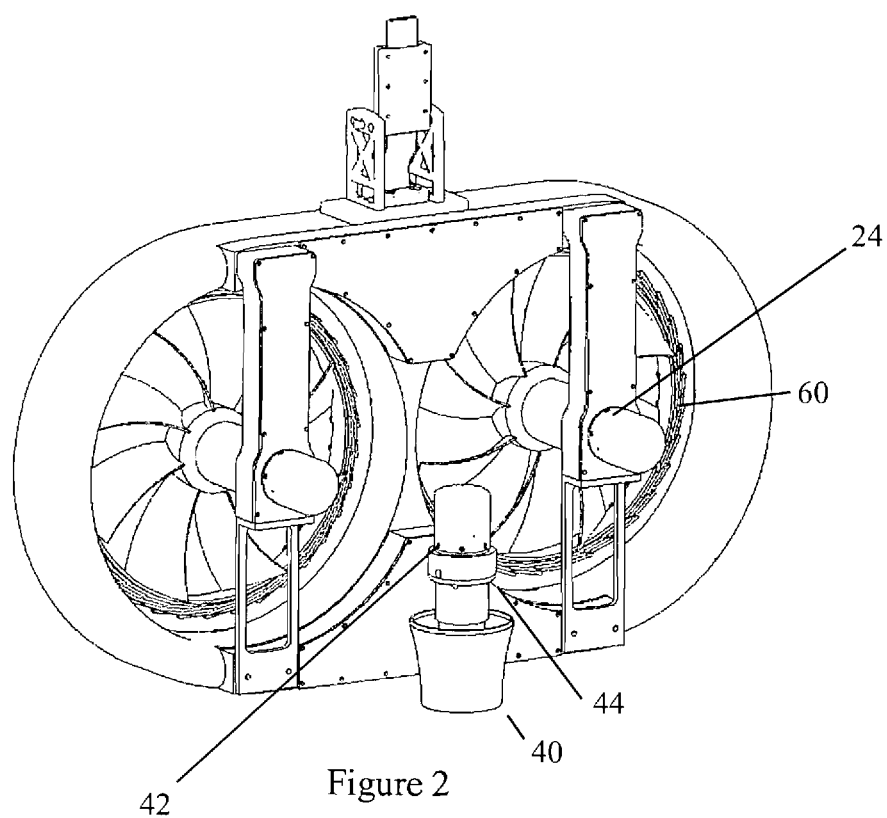
FIG. 2 is a rear perspective view.
Figure 3:
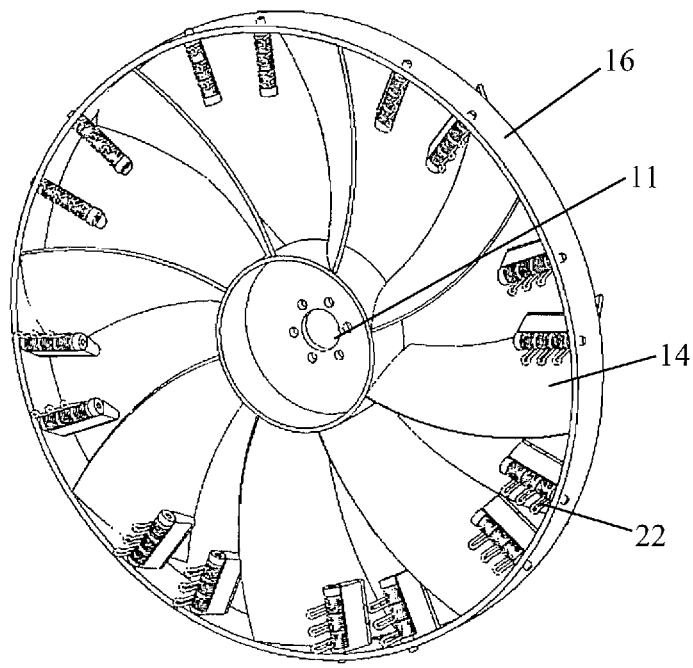
FIG. 3 illustrates torsion spring assembly on a propeller wheel.
Figure 4:
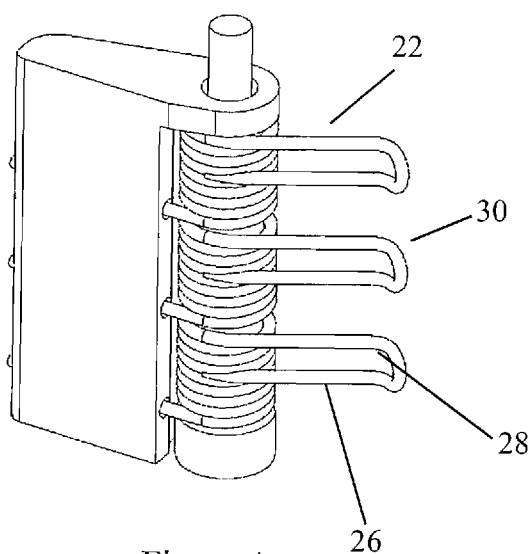
FIG. 4 illustrates torsion springs assembly.
Figure 5:
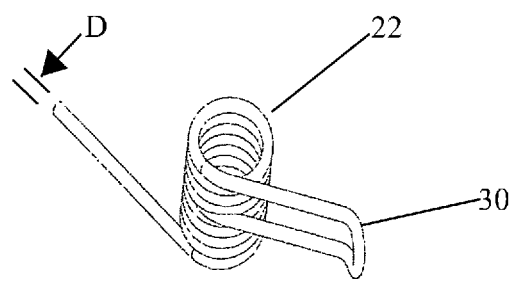
FIG. 5 illustrates a wire finger of a torsion spring assembly.
Figure 6:
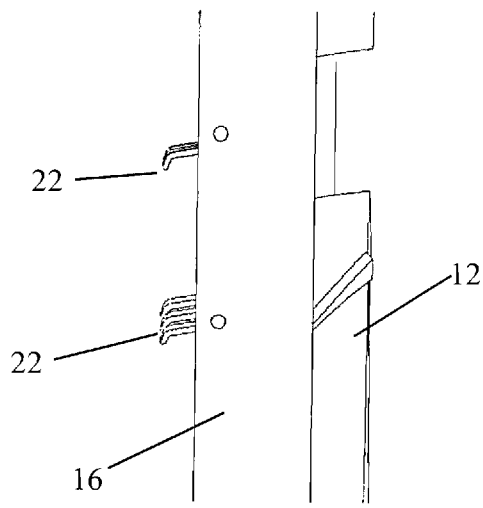
FIG. 6 illustrates torsion spring assembly spacing.

FIG. 2 depicts a thruster 40 used to propel the cleaning head assembly 10 left or right on a net. The thruster 40 can be propelled by an electric or hydraulic motor 42, and is pivotally mounted 44 to swivel up to 90 degrees right or left of its forward position.

Referring to FIGS. 8-13 the cleaning head 10 may include rigid cleaning features defined as knuckles secured to the propeller perimeter rim 16. The knuckles 52 are at a maximum 60 degree angle to the perimeter rim 16 and a minimum of 30 degrees to the perimeter rim extending ½" to 2" from an outer edge of the propeller 18. The knuckles 52 further enhance cleaning the net and are particularly useful in high growth summer months when cleaning is difficult to maintain and mussels, barnacles and kelp grow on the net very quickly and are difficult to remove. The knuckles 52 contact the net to loosen shells and accelerate the net to disrupt shell attachment. The knuckles 52 are very effective for heavier fouling and shells that can have significant weight and water drag.

The forward propulsion of the cleaner head 10 against the net must be strong enough to push the knuckles 52 into the holes or spaced formed in the net. In particular, the knuckles 52 are sized and shaped to fit into the holes of the net. The speed of the perimeter rim supporting the knuckle 52 must be slow enough to allow a knuckle 52 to enter the hole of the net. When these factors are correct the impact of the knuckle 52 striking heavy fouling and shaking the net are effective to clean the most difficult fouling.

The net installed in an offshore aquaculture cage is kept tight with weights at the bottom to keep shape against water current and waves. The net can only be moved a small amount from a force parallel to its surface, but can be displaced significantly more easily with a force perpendicular to the net face. The knuckles 52 shake the net violently with high contact velocity and impact that does not harm the soft net while easily removing heavy fouling and fouling with higher water drag like grasses and kelp.

The articulated high angle ramp of the knuckle 52 forces the net 90 degrees to its face beginning with a jerk on contact and then a high velocity perpendicular to the face of the net. The impact, acceleration and velocity combination of the net is key to the effectiveness of knuckle cleaning.

Side by side test of current high pressure water technology versus the current invention with ramped knuckle design was performed. A trained diver in the cage gave visual estimates of % of hard shells removed. Mussels and barnacles were the most common fouling.

| Type | Horsepower consumed | Performance on hard shell removal | #knuckle | Speed RPM |
| --- | --- | --- | --- | --- |
| High Pressure water Typical 5000 PSI | 15-25 | 30-50% | 0 | n/a |
| Hydraulic drive | 6 | 90-100% | 8 | 80 |
| Electric drive | 4 | 90-100% | 4 | 95 |

The two counter rotating propellers were eighteen inches in diameter providing 1 meter of cleaning width. 8 blade propellers provided 30 lbs. of thrust. Test were run with four and eight knuckles per blade. All knuckles were 45 degree ramp ⅜ inch wide. knuckles in the perimeter only.

Figure 10:
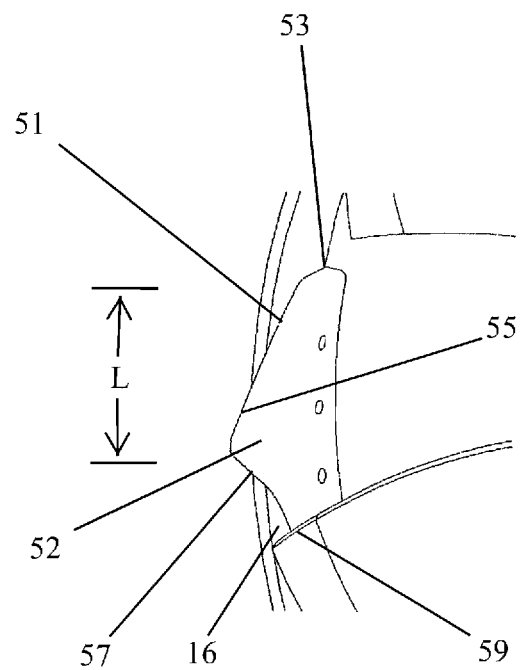
FIG. 10 illustrates a perspective view of a knuckle.
Figure 11:
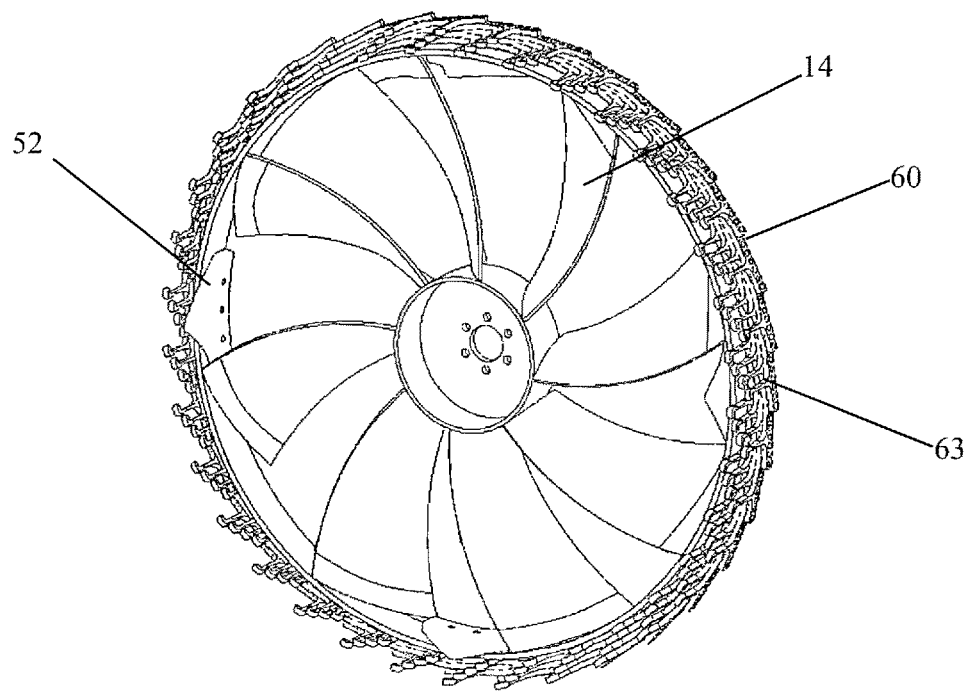
FIG. 11 illustrates a propeller with fingers and knuckles attached.
Figure 12:
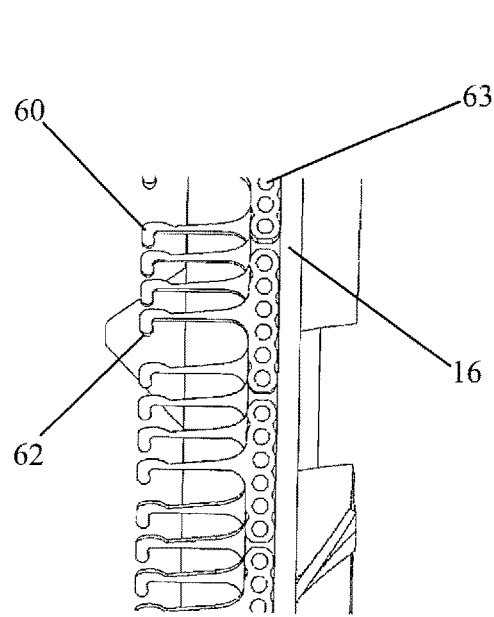
FIG. 12 is a side view of a group of fingers
Figure 13:
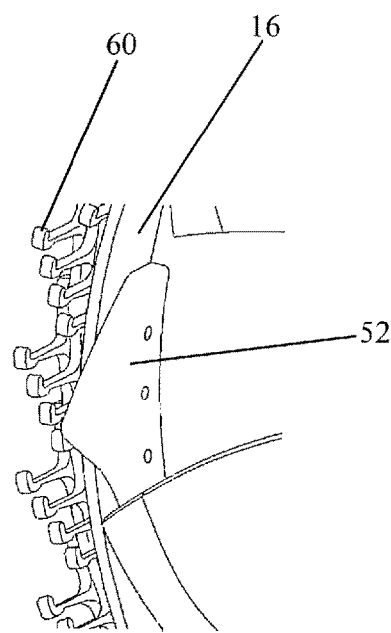
FIG. 13 is a perspective view of a group of fingers and knuckles attached to propeller.
Figure 14:
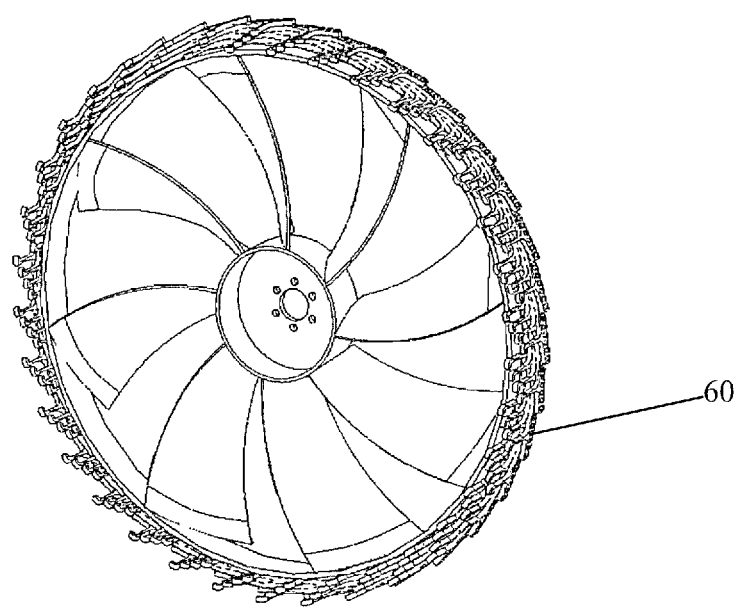
FIG. 14 is a perspective view of finger groups on a propeller rim.
Figure 15:
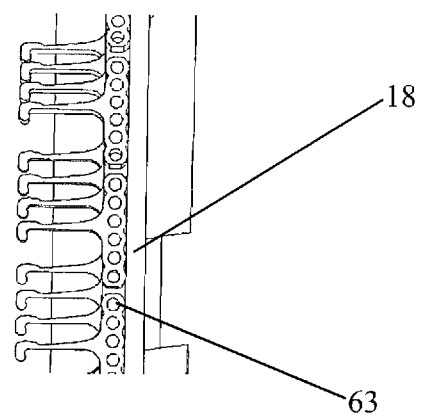
FIG. 15 is a side view of a finger group.
Figure 16:
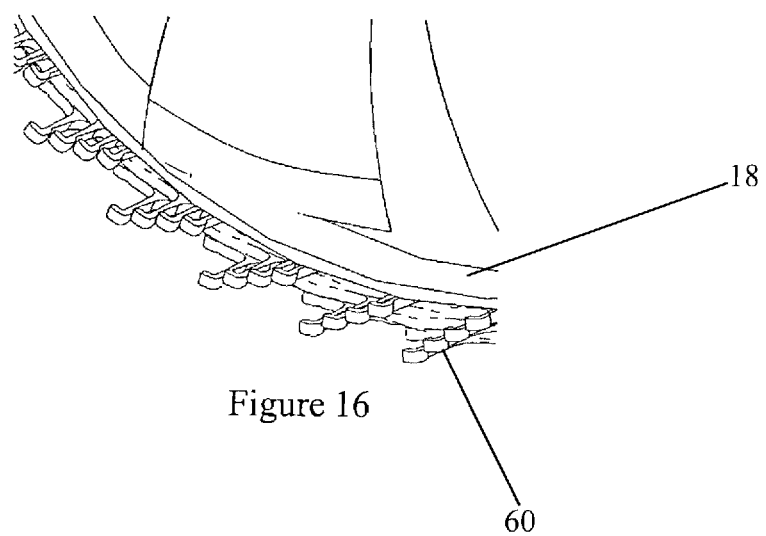
FIG. 16 is a perspective view of a propeller with a finger group.
Figure 17:
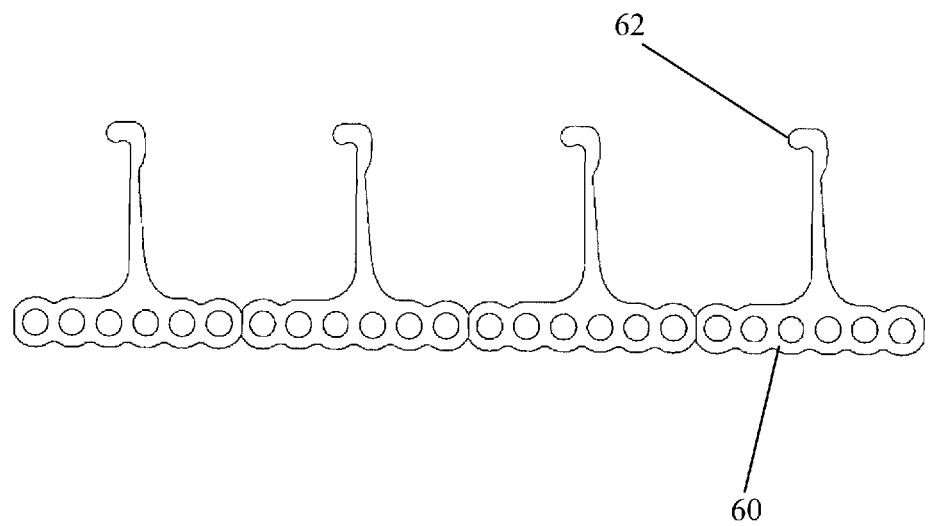
FIG. 17 is a side view of a finger illustrating an elongated neck and wearable areas below the top section.

Referring to FIG. 10, depicted is a knuckle 52 having a length L with a forward slope 51 leading from a proximate end 53 attached to the perimeter rim 16 to a peak 55 extending outwardly from the perimeter rim 16 to a rearward slope 57 leading from the peak 55 to a distal end 59 attached to the perimeter rim 16. Various knuckles were made with changing knuckle height and angle to the rim of the propeller. For smaller nets of openings of ¾ inch to 1½ inch were found to be cleaned at or near the 100% effectiveness using a 45 degree angle and a height equal to the opening of the net. For very large opening in a predator net of 2-5 inches the knucles did not need to be over 1½ inch height and angles had to exceed 30 degrees to be effective and improved to almost 60 degrees. Higher angles above 60 degrees did not improve cleaning and consumed more power. Perimeter or knuckle speeds were kept constant at 6 ft./sec., determined to be an efficient speed for good propeller forward performance.

Referring to FIGS. 11-17, illustrated are fingers 60 secured to the perimeter rim 16 by fasteners 63 having a long length constructed from a high durometer elastomer and include wearable areas 62 to improve life. The longer hooks and improved wear areas work well with 90 A to 50 D durometer elastomers. Testing has found that certain polymers have improved results. In particular, Pebax® with 5% silane has doubled finger life from approximately 5000 sq. meters cleaned to 20,000 square meters of cleaning and with moderate fouling 100,000 sq meters cleaned before fingers are changed. Cleaning pressures for the fingers 60 on the net are approximately 4-10 PSI and forward perimeter finger speeds range from 5-10 feet/second.

Key to maximized cleaning of the net is the cleaning features comprising the fingers/knuckles/and torsions feature elements. The propellers push the cleaning feature elements against a net face. The ability of the cleaning feature elements being elastomeric or spring material allow entrance to the opening of the net. The torsion cleaning feature elements are shaped with a forward bend at the tip to contact more than 90 degrees of the net circumference measured from the forward tangent face surface. The feature being shaped to contact and pull on the twine of the net before passing and releasing. Impact the next twine during rebound to assist cleaning. The three cleaning features together shake and remove fouling effectively and efficiently. Aquaculture nets vary based on fish size and strength required. Selection of the best cleaning element and propeller speed can optimize cleaning and outperform all other technology.

The finger hooks and the knuckles are not mutually exclusive and can be used independently or separately dependent on the cleaning needed.

Generally the knuckles are most effective for larger dense populations of hard shells and barnacles, having more weight or mass than soft growth and therefore more cleaning by forces of high acceleration and impact. The hook shaped elastomeric or torsion wire fingers are more effective for more complete cleaning of soft growth that forms early in the fouling process before large hard shells. When cleaning often with elastomeric or wire fingers, larger hard shells may never get a chance to grow and knuckle cleaners would not be needed.

Often only the sides of cages are cleaned because they are more important for water flow and easier to clean than the bottom net which can be more difficult because it being horizontal and gravity cannot be used to forward the cleaner. This can be solved by adding a thruster to pull the cleaner head along the bottom of the cage.

Additional problems exist if cleaning the bottom of the net from the outside because the cleaning head must be able to propel the cleaning head upward with sufficient force against the weight of the cleaning head to the bottom of the net.

For faster submergence and bottom cleaning a third propeller for forward thrust is used. The thruster can also be used for steering and controlled dynamically for steering if necessary.

The cleaner head frame and body is a hollow container providing a curved surface encircling the propellers to assist moving over small obstacles, flat sides prevent entangling, and water tight opening areas for mounting assemblies internally and externally. Internally mounting is provided for motor control boards, wiring, connectors and control devices. Externally to the container is mounting facilities for mounting main propeller drive wheel assemblies, forward thruster assembly, video cameras, and cable strain relief. The container will also include hydraulic connections and controls if the unit is hydraulic powered.

Steel docks on square cages usually are made with a 6 ft or 2 meter width. Special requirements to move equipment on the dock include compactness and excellent short radius steering. Turning at the corner of the cages is best accomplished with 4 wheel steering.

Automation of the current invention is accomplished with a programmable controller. Reversing a cable storage spool at the top and bottom of deployment cleaning cycles the device along a net, and powering at least one tractor drive wheel forward the width of the cleaning head moves the device up and down during each cleaning cycle. A preprogrammed length of cleaning can be accomplished without worker intervention.

All patents and publications mentioned in this specification are indicative of the levels of those skilled in the art to which the invention pertains. All patents and publications are herein incorporated by reference to the same extent as if each individual publication was specifically and individually indicated to be incorporated by reference. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An apparatus for cleaning nets underwater comprising a cleaning head formed from a plurality of propellers mounted to a hub that is rotated by a motor, said propellers having a perimeter rim for receipt of cleaning knuckles, each said knuckle having a length with a forward slope facing a direction of rotation and leading from a proximate end attached to said perimeter rim to a peak extending outwardly from said perimeter rim to a rearward slope facing away from the direction of rotation and leading from said peak to a distal end attached to said perimeter rim, wherein rotation of said propeller provides thrust for positioning said cleaning head against a net positioned underwater whereby said knuckles are constructed and arranged to remove fouling from the net causing the net to ride up the forward slope of each knuckle and upon the net traversing the knuckle peak the net returns to position.

2. The apparatus according to claim 1 including rigid knuckle features with an articulated high angle, attached to the perimeter rim constructed and arranged to force a net 90 degrees to a net surface with a jerk on contact and then a high velocity perpendicular to the surface of the net thereby loosening shells and barnacles for removal from said nets.

3. The apparatus according to claim 1 including a thruster to propel the underwater cleaning head assembly forward parallel on the net and operate in the left or right direction.

4. The apparatus according to claim 3 wherein said thruster is propelled by an electric or hydraulic motor.

5. The apparatus according to claim 3 wherein said thruster is pivotally mounted for swiveling up to 90 degrees right and left of its forward position.

6. The apparatus according to claim 1 including a propeller in series, said series propellers counter-rotating.

* * * * *